United States Patent
Chung et al.

(10) Patent No.: US 8,850,448 B2
(45) Date of Patent: Sep. 30, 2014

(54) DYNAMIC RECONFIGURABLE HETEROGENEOUS PROCESSOR ARCHITECTURE WITH LOAD BALANCING AND DYNAMIC ALLOCATION METHOD THEREOF

(71) Applicant: National Chiao Tung University, Hsinchu (TW)

(72) Inventors: Chung-Ping Chung, Hsinchu (TW); Hui-Chin Yang, Zhubei (TW); Yi-Chi Chen, New Taipei (TW)

(73) Assignee: National Chiao Tung University, Hsinchu (TW)

( * ) Notice: Subject to any disclaimer, the term of this patent is extended or adjusted under 35 U.S.C. 154(b) by 0 days.

(21) Appl. No.: 14/173,333

(22) Filed: Feb. 5, 2014

(65) Prior Publication Data

US 2014/0157285 A1 Jun. 5, 2014

Related U.S. Application Data

(63) Continuation-in-part of application No. 13/020,571, filed on Feb. 3, 2011.

(30) Foreign Application Priority Data

Feb. 11, 2010 (TW) ............................... 99104390 A

(51) Int. Cl.
*G06F 9/46* (2006.01)
*G06F 9/50* (2006.01)

(52) U.S. Cl.
CPC .............. *G06F 9/505* (2013.01); *G06F 9/5083* (2013.01)
USPC ........................................................ 718/105

(58) Field of Classification Search
None
See application file for complete search history.

(56) References Cited

U.S. PATENT DOCUMENTS

| | | | |
|---|---|---|---|
| 7,310,674 B2 | 12/2007 | Mitsumori | |
| 8,144,149 B2 | 3/2012 | Jiao et al. | |
| 2003/0079004 A1 | 4/2003 | Mitsumori | |
| 2007/0091089 A1 | 4/2007 | Jiao et al. | |
| 2009/0055596 A1* | 2/2009 | Wallach et al. | 711/141 |

OTHER PUBLICATIONS

Wang, Wei-Ting et al., A Run-Time Reconfigurable Fabric for 3D Texture Filtering, 18th IEEE International Conference on Application-specific Systems, Architectures and Processors, Jul. 2007, pp. 180-185.

(Continued)

*Primary Examiner* — Meng An
*Assistant Examiner* — James J Lee
(74) *Attorney, Agent, or Firm* — Muncy, Geissler, Olds & Lowe, P.C.

(57) ABSTRACT

A dynamic reconfigurable heterogeneous processor architecture with load balancing and dynamic allocation method thereof is disclosed. The present invention uses a work control logic unit to detect load imbalance between different types of processors, and employs a number of dynamic reconfigurable heterogeneous processors to offload the heavier loaded processors. Hardware utilization of such design can be enhanced, and variation in computation needs among different computation phases can be better handled. To design the dynamic reconfigurable heterogeneous processors, a method of how to choose the basic building blocks and place the routing components is included. With the present invention, performance can be maximized at a minimal hardware cost. Hence the dynamic reconfigurable heterogeneous processor(s) so constructed and the load balancing and dynamic allocation method together will have the best performance at least cost.

14 Claims, 9 Drawing Sheets

(56) References Cited

OTHER PUBLICATIONS

Chen, Jiawen et al., A Reconfiguable Architecture for Load-Balanced Rendering, ACM Siggraoh/Eurographics Conference on Graphic Hardware, 2005, pp. 71-80.

Grajcar, Martin et al., Genetic List Scheduling Algorithm for Scheduling and Allocation on a Loosely Coupled Heterogeneous Multiprocessor System, $36^{th}$ ACM IEEE DAC, 1999, pp. 280-285.

* cited by examiner

US 8,850,448 B2

DYNAMIC RECONFIGURABLE HETEROGENEOUS PROCESSOR ARCHITECTURE WITH LOAD BALANCING AND DYNAMIC ALLOCATION METHOD THEREOF

This application claims priority for Taiwan patent application no. 099104390 filed on Feb. 11, 2010, the content of which is incorporated by reference in its entirety.

The present invention is a continuation-in-part application of the application that is entitled "DYNAMIC RECONFIGURABLE HETEROGENEOUS PROCESSOR ARCHITECTURE WITH LOAD BALANCING AND DYNAMIC ALLOCATION METHOD THEREOF" (U.S. application Ser. No. 13/020,571), which is filed presently with the U.S. Patent & Trademark Office, and which is used herein for reference in its entirety.

BACKGROUND OF THE INVENTION

1. Field of the Invention

The present invention is a kind of computer architecture, a load balancing reconfigurable heterogeneous processor architecture with dynamic allocation method for high performance in particular.

2. Description of the Related Art

As today's semiconductor technology advances at a rate sketched by the Moore's law, the assorted digital information apparatus tends to integrate processors with various functions into SoC (System-on-a-Chip) to suit the needs of versatility and small form factor. While such an SoC is at work, the characteristics of the application tend to use some processors of certain type intensively but leave those of other types idling from time to time, causing the abundant hardware resources often unevenly used. This ever-changing needs for different types of processors along time greatly lower the overall performance.

For example, the vastly used GPUs (Graphic Processing Units) in computer systems consist of large numbers of vertex shaders and pixel shaders. They process graphics through coordinate and light transformations, texture compression/decompression, bi-linear pixel shading, etc., to render graphics. The first task among these, vertex shading, shades vertices of geometries through coordinate and light transformation using a large number of vertex shaders. These shaded vertices are then passed on to another group of large number of pixel shaders and texture units for texture compression/decompression, bi-linear pixel shading, etc. As a result, often the number of pixels to be processed occasionally becomes much greater than the number of vertices, or while the vertex shaders are busy processing, the pixel shaders and texture units are idling; whereas while the pixel shaders and texture units are busy processing, the vertex shaders have little work to do. This fact makes the two sets of processors run unevenly along time, lowering the overall performance of the GPU. One solution may be to use unified shaders, but the costs are more complex shader circuits and routings.

To deal with such a deficiency, the US Patent US2007/0091089A1 proposes a dynamically allocateable GPU system with method, which is equipped with multiple sharable units such as a sharable vertex processor, a sharable geometry processor, and a sharable pixel processor. Through at least one control unit, the sharable processors are assigned execution tasks, and the workload of each processor is monitored. Those unloaded sharable processors can be assigned to assist the loaded sharable processors.

However, the aforementioned patent US2007/0091089A1 uses a plurality of shareable shaders to share the loads of various shading tasks, resulting in complicated hardware design and its associated monitoring and load sharing algorithm. The present invention is intended to resolve such difficulties. The present invention presents dynamic reconfigurable heterogeneous processors architecture with load balancing and dynamic allocation method

SUMMARY OF THE INVENTION

The primary objective of this invention is to propose a load-balancing, dynamic reconfigurable heterogeneous processors architecture with dynamic reconfiguration and allocation method. It uses a (plurality of) dynamically reconfigurable processor(s) to share the loads of heavily loaded processor(s) to improve overall system performance.

A secondary objective of this invention is that it should achieve a good cost/performance measure. This is due to the increased performance is the result of only very small silicon area and energy overheads.

A further objective of this invention is that it is easily applicable to the various digital system designs that process heterogeneous data and/or operations. The present invention's high compatibility with most such digital system designs is due to its efficient use of hardware and self-management.

To achieve the aforementioned objectives, the presented invention, the dynamic reconfigurable heterogeneous processor architecture with load balancing and dynamic allocation method thereof, consists of a plurality of processors, one or more dynamic reconfigurable heterogeneous processors, and a work control logic unit. The dynamic reconfigurable heterogeneous processor(s) are treated similarly to the other processors, and the work control logic unit is connected to all these heterogeneous and reconfigurable processors. By monitoring the workload of each processor (possibly through examining the usage of its associated data buffer), the work control logic unit analyzes the loadings of all processors, and determines if which reconfigurable processor should be assigned to assist which processor type. Hence the goal of balancing processor workloads and increasing performance can be achieved.

In the following, the embodiments of this invention are described in detail, together with schematic illustrations, to help understand the invention's objectives, its technical contents, special features, and how it achieves the goals.

DETAILED DESCRIPTION OF THE INVENTION

The present invention reveals a heterogeneous processor architecture with dynamically reconfigurable processor(s) and load balancing mechanism. It uses a work control logic unit to dynamically assign reconfigure processor(s) to assist other processor(s) to balance the loads of the processors. In the following a design example is used to illustrate the technical features of this invention.

Figure 1:
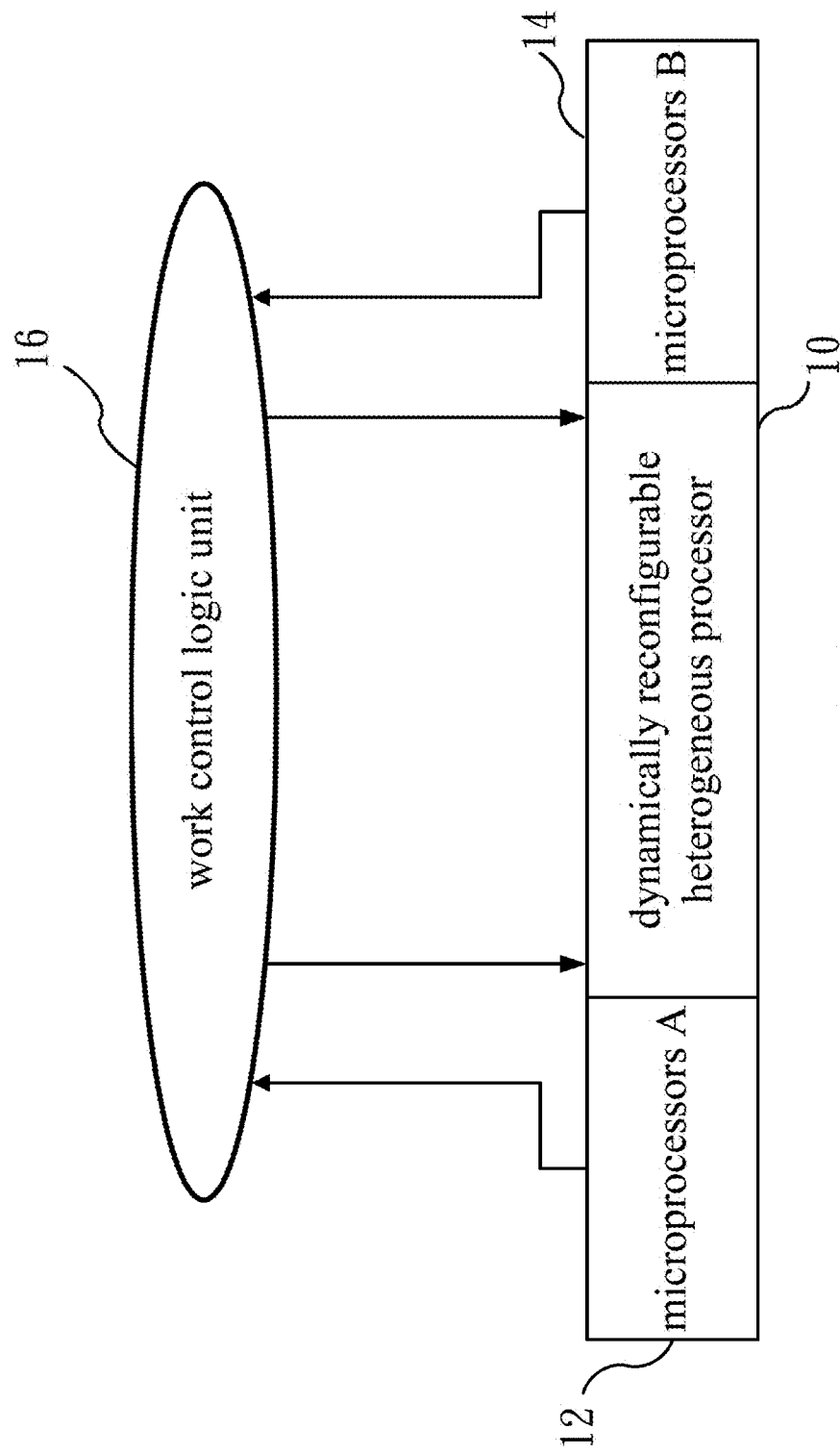
FIG. 1 is a schematic diagram showing a dynamic reconfigurable heterogeneous processor system according to an embodiment of the present invention.

FIG. 1 is a schematic diagram showing a dynamic reconfigurable heterogeneous processor system according to an embodiment of the present invention. In FIG. 1, a dynamic reconfigurable heterogeneous processor 10 is placed in between microprocessors A 12 and microprocessors B 14. (Only one processor of each type is shown for simplicity, although the number of each type can be arbitrary.) The dynamic reconfigurable heterogeneous processor 10 is a processor that is capable of supporting multiple contexts such as vertex processing and pixel processing. Microprocessors A 12 and B 14 each may be a graphic processor, an embedded processor, a digital signal processor, or a multimedia processor, and assume that they are different from each other. The dynamic reconfigurable heterogeneous processor 10 can be configured to perform the function of either A 12 or B 14. A work control logic unit 16 is connected to microprocessors A 12, B 14, and the dynamic reconfigurable heterogeneous processor 10. The work control logic unit 16 examines the loadings of microprocessors A 12 and B 14 (possibly through examining the usages of their associated data buffers), and determines if the dynamic reconfigurable heterogeneous processor should be allocated to assist whichever microprocessor with noticeably heavier load. This allocation is done by configuring the dynamic reconfigurable heterogeneous processor 10 to the specified microprocessor function type, and reroute data links such that the configured processor 10 can receive data for the specified microprocessor and send results to proper destination, both dynamically.

Figure 2:
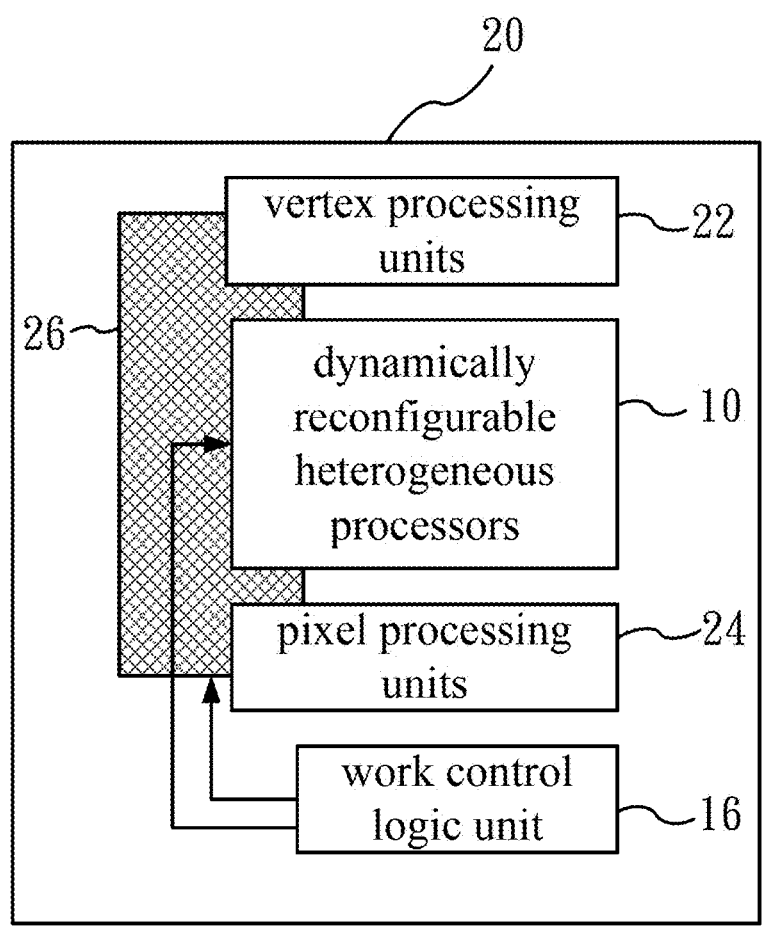
FIG. 2 is a schematic diagram showing the system of a graphic processing unit according to an embodiment of the present invention.

The present invention is applicable to many digital system designs such as graphics processing unit design. FIG. 2 shows a way of applying the present invention in graphic processor unit design. The graphic processing unit 20 consists of vertex processing units 22, pixel processing units 24, and dynamic reconfigurable heterogeneous processors 10, interconnected with the interconnection and routing path 26. A work control logic unit 16 monitors the vertex processing units 22 and pixel processing units 24, and assigns the dynamic reconfigurable heterogeneous processors to whichever units with noticeably heavier load by dynamically reconfiguring the dynamic reconfigurable heterogeneous processors and rerouting data links in the interconnection and routing path 26. This helps to balance the loads of the vertex processing units 22 and pixel processing units 24.

Figure 3:
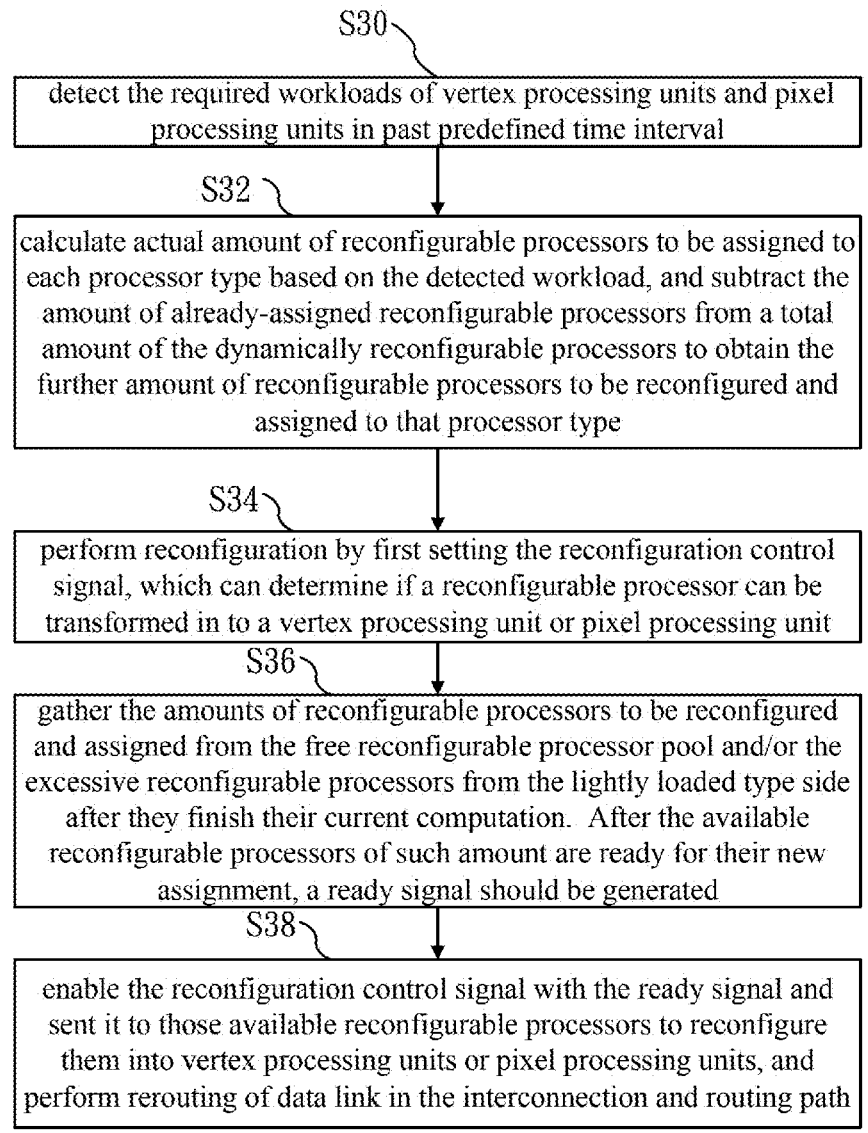
FIG. 3 is a flowchart of the load balancing dynamic allocation method according to an embodiment of the present invention.

Above is the explanation to the architecture of the dynamic reconfigurable heterogeneous processor. In the following the dynamic allocation method and the design flow of dynamic reconfigurable heterogeneous processor system architecture are to be introduced. FIG. 3 shows the flow of the load balancing dynamic allocation method. Refer also to FIG. 2 when appropriate. In FIG. 3, first, in step S30, the work control logic unit 16 dynamically detects the required workloads of vertex processing units 22 and pixel processing units 24 in past predefined time interval. Then, in step S32, the work control logic unit 16 calculates the actual amount of reconfigurable processors 10 to be assigned to each processor type 22 or 24 based on the detected workloads, and subtracts the amount of already-assigned reconfigurable processors 10 from a total amount of the dynamically reconfigurable processors 10 to obtain the further amount of reconfigurable processors 10 to be reconfigured and assigned to that processor type 22 or 24. The total amount of the dynamically reconfigurable processors 10 includes an amount of the dynamically reconfigurable processors 10 at present and the dynamically reconfigurable processors 10 calculated by the work control logic unit 16 and required at the next stage. Then, in step S34, the reconfiguration is performed by first setting the reconfiguration control signal, which can determine if a reconfigurable processor 10 is to be transformed in to a vertex processing unit 22 or pixel processing unit 24. Then, in step S36, the amounts of reconfigurable processors 10 to be reconfigured and assigned are gathered from the free reconfigurable processor 10 pool and/or the excessive reconfigurable processors 10 from the lightly loaded type side after they finish their current computation. After the available reconfigurable processors 10 of such amounts are ready for their new assignments, a ready signal should be generated. Finally, in step S38, the reconfiguration control signal is enabled by the ready signal and sent to these available reconfigurable processors 10 to reconfigure them into vertex processing units 22 or pixel processing units 24. The rerouting of data links in the interconnection and routing path 26 is also performed by the work control logic unit 16 in this load balancing process; its details are not elaborated here to save space.

Above is the explanation to the dynamic allocation method. In this and subsequent paragraphs, the design flow of the dynamic reconfigurable heterogeneous processors 10 is introduced, and the graphic processing unit 20 is again used for example. With the work control logic unit 16, this invention dynamically allocate dynamic reconfigurable heterogeneous processors 10 to be vertex processing units 22 or pixel processing units 24, balancing processing time of vertices and pixels and enhancing hardware utilization of the graphic processing unit 20. The overall system performance is thus improved. Yet in order to achieve this advantage, such dynamic reconfigurable heterogeneous processors 10 must pay the cost for extra hardware compared with intrinsic vertex processing unit 22 or pixel processing unit 24. It is therefore important to derive a dynamic reconfigurable heterogeneous processor 10 design that is both low-cost and high-performance. FIGS. 4(*a*) to 4(*d*) are schematic diagrams showing operation requirement trees of a circuit design of a dynamic reconfigurable heterogeneous processor 10. Refer also to FIG. 2 when appropriate. First, based on the functional requirements in vertex and pixel shading, four mutually independent operation requirement trees for the vertex processing units 22 and pixel processing units 24, operation requirement tree 30, operation requirement tree 40, operation requirement tree 50, and operation requirement tree 60 are constructed. These four mutually independent operation requirement trees each comprises a plurality of operation nodes 32, and higher-level operation nodes in these trees are each constructed using its descendent operation nodes 32. On the lower-right side of each operation node 32, a number indicates the amount of such operation nodes 32 to be needed. The operation requirement tree helps to show the underlying hardware requirements of those useful fundamental operations in targeted applications. In the following, these operation requirement trees 30, 40, 50, and 60, shown in FIGS. 4(a) to 4(d), will be explained in detail.

Figure 4A:
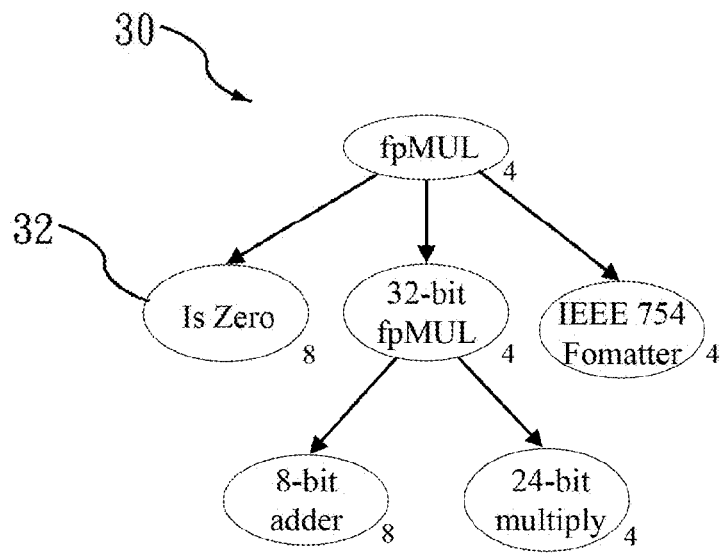
FIGS. 4(a)-4(d) are schematic diagrams showing operation requirement trees of a dynamic reconfigurable heterogeneous processor design according to an embodiment of the present invention.
Figure 4B:
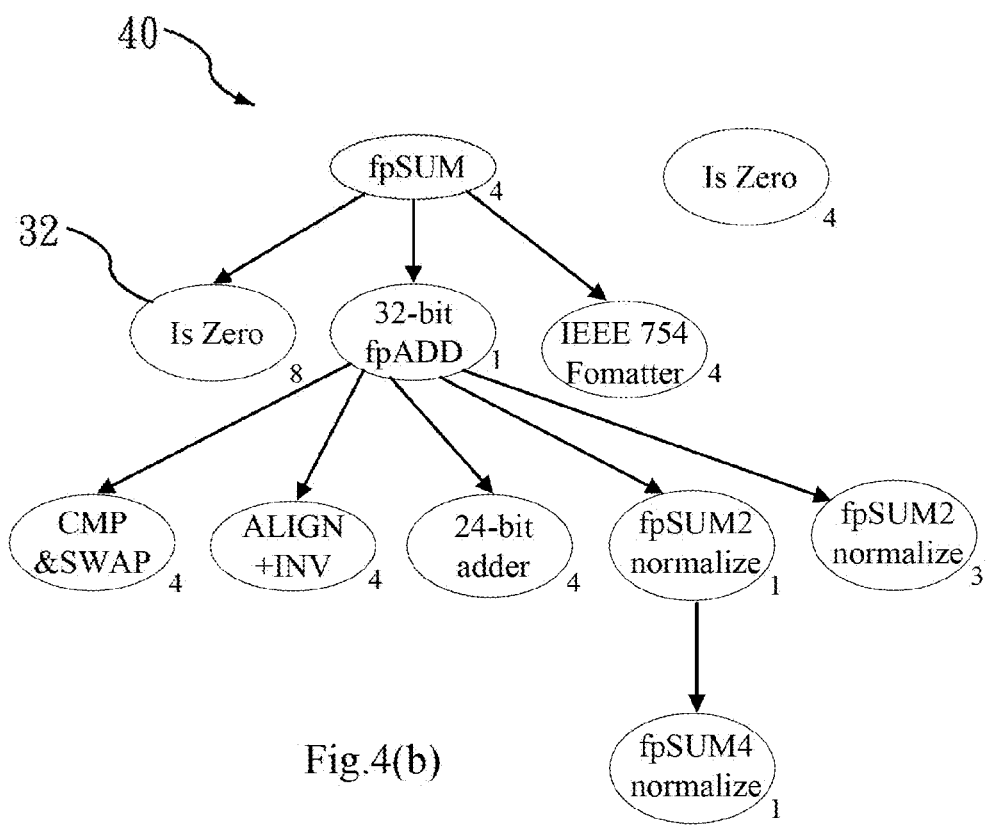

FIG. 4(a) shows that the operation requirement tree 30 has six operation nodes 32. It consists of four floating-point multipliers (fpMUL), which in turn consists of eight zero detectors (IsZero), four 32-bit floating-point multipliers (32-bit fpMUL) and four IEEE 754 formatters (IEEE 754 Formatter). And the four 32-bit fpMULs are constructed with eight 8-bit adders (8-bit adder) and four 24-bit multipliers (24-bit multiply). FIG. 4(b) shows that the operation requirement tree 40 consists of eleven operation nodes 32. It consists of four floating-point adders (fpSUM), which in turn consists of eight zero detectors (IsZero), one 32-bit floating-point adder (32-bit fpADD), and four IEEE 754 formatters (IEEE 754 Formatter). And the 32-bit fpADD is constructed with four compare-and-swappers (CMP&SWAP), four align-and-inverters (ALIGN+INV), four 24-bit adders (24-bit adder), one floating-point normalizer for floating-point 2-operand adder (fpSUM2 normalize), one floating-point normalizer for floating-point 4-operand adder (fpSUM4 normalize), and three floating-point normalizer for floating-point 2-operand adder (fpSUM2 normalize). It also consists of four other zero detectors (IsZero).

Figure 4C:
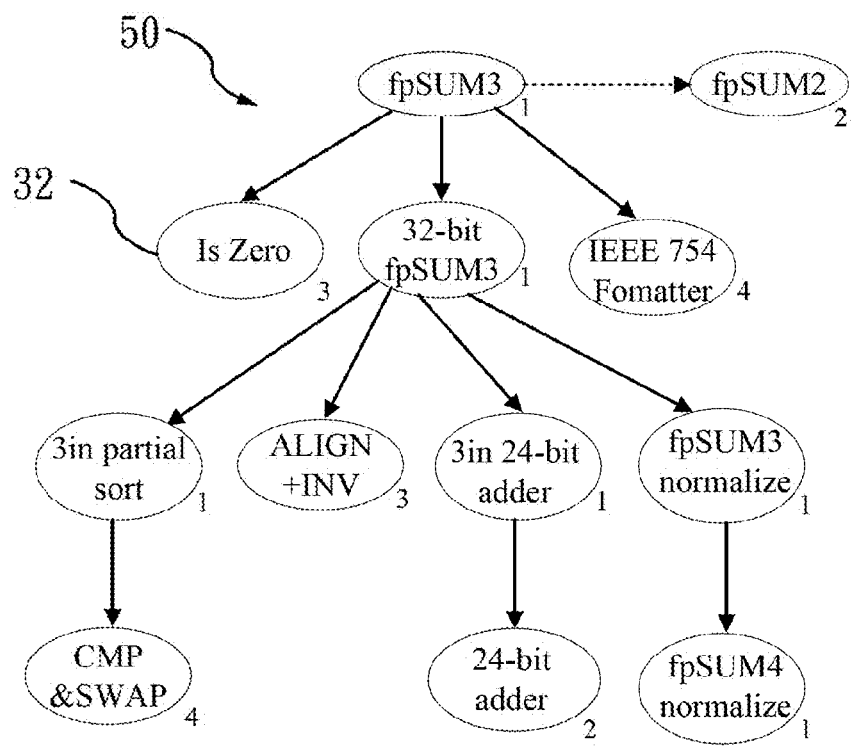
Figure 4D:
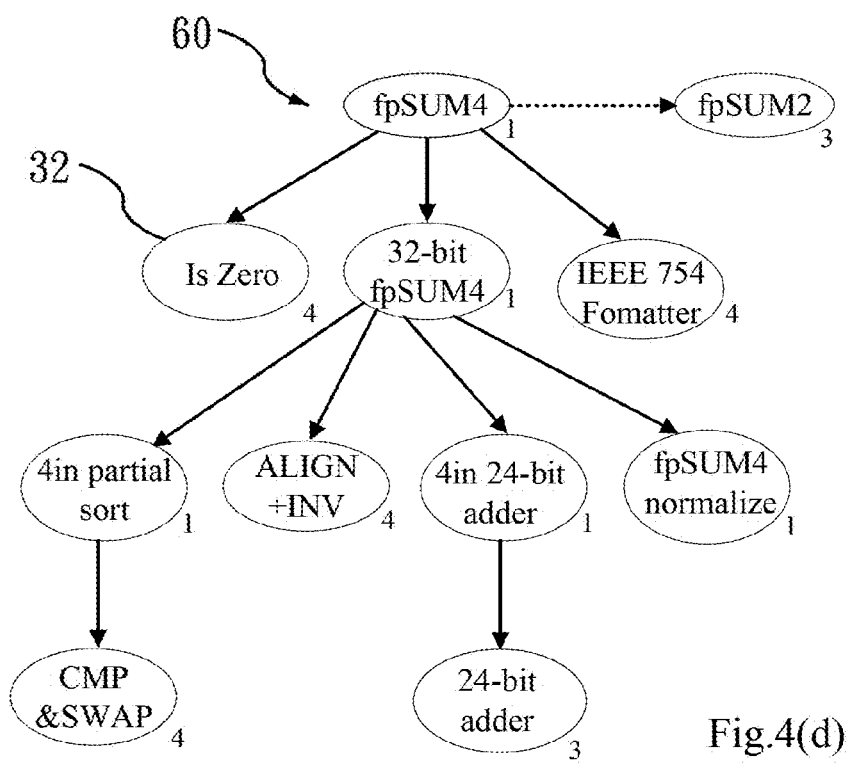

FIG. 4(c) shows that the operation requirement tree 50 has twelve operation nodes 32. It consists of one floating-point 3-operand adder (fpSUM3), which in turn consists of three zero detectors (IsZero), one 32-bit floating-point 3-operand adder (32-bit fpSUM3) and four IEEE 754 formatters (IEEE 754 Formatter). And the 32-bit floating-point 3-operand adder (32-bit fpSUM3) is constructed with one 3-input partial sorter (3in partial sort) which further consists of four compare-and-swappers (CMP&SWAP), three align-and-inverters (ALIGN+INV), one 3-input 24-bit adder (3in 24-bit adder) which further consists of two 24-bit adders (24-bit adder), and one floating-point normalizer for floating-point 3-operand adder (fpSUM3 normalize) which further consists of one floating-point normalizer for floating-point 4-operand adder (fpSUM4 normalize). There are in addition two floating-point 2-operand adders (fpSUM2). The dotted arrow means that the operation node pointed at by the arrow can be used to substitute for the operation node at the origin of the arrow, and the lower right numbers indicate the corresponding amounts of the respective hardware units. FIG. 4(d) shows that the operation requirement tree 60 also consists of eleven operation nodes 32. It consists of one floating-point 4-operand adder (fpSUM4), which in turn consists of four zero detectors (IsZero), one 32-bit floating-point 3-operand adder (32-bit fpSUM3) and four IEEE 754 formatters (IEEE 754 Formatter). And the 32-bit floating-point 4-operand adder (32-bit fpSUM4) is constructed with one 4-input partial sorter (4in partial sort) which further consists of four compare-and-swappers (CMP&SWAP), four align-and-inverters (ALIGN+INV), one 4-input 24-bit adder (4in 24-bit adder) which further consists of three 24-bit adders (24-bit adder), and one floating-point normalizer for floating-point 4-operand adder (fpSUM4 normalize). There are in addition three floating-point 2-operand adders (fpSUM2). And a dotted arrow indicates that the three floating-point 2-operand adders (fpSUM2) can be used to substitute for the floating-point 4-operand adder (fpSUM4)

Figure 5:
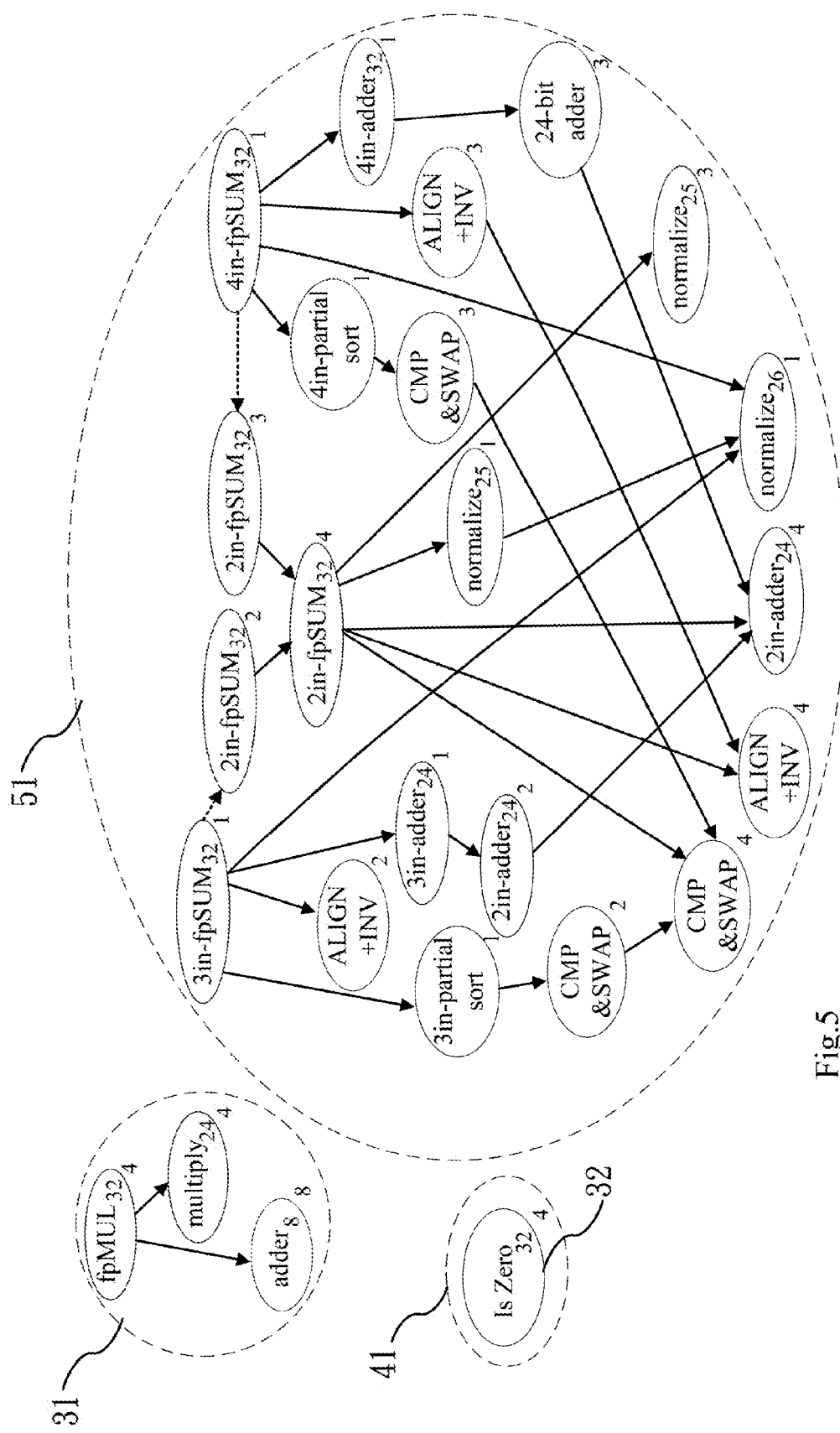
FIG. 5 is a schematic diagram showing block-selection trees of the dynamic reconfigurable heterogeneous processor design according to an embodiment of the present invention.
Figure 6:
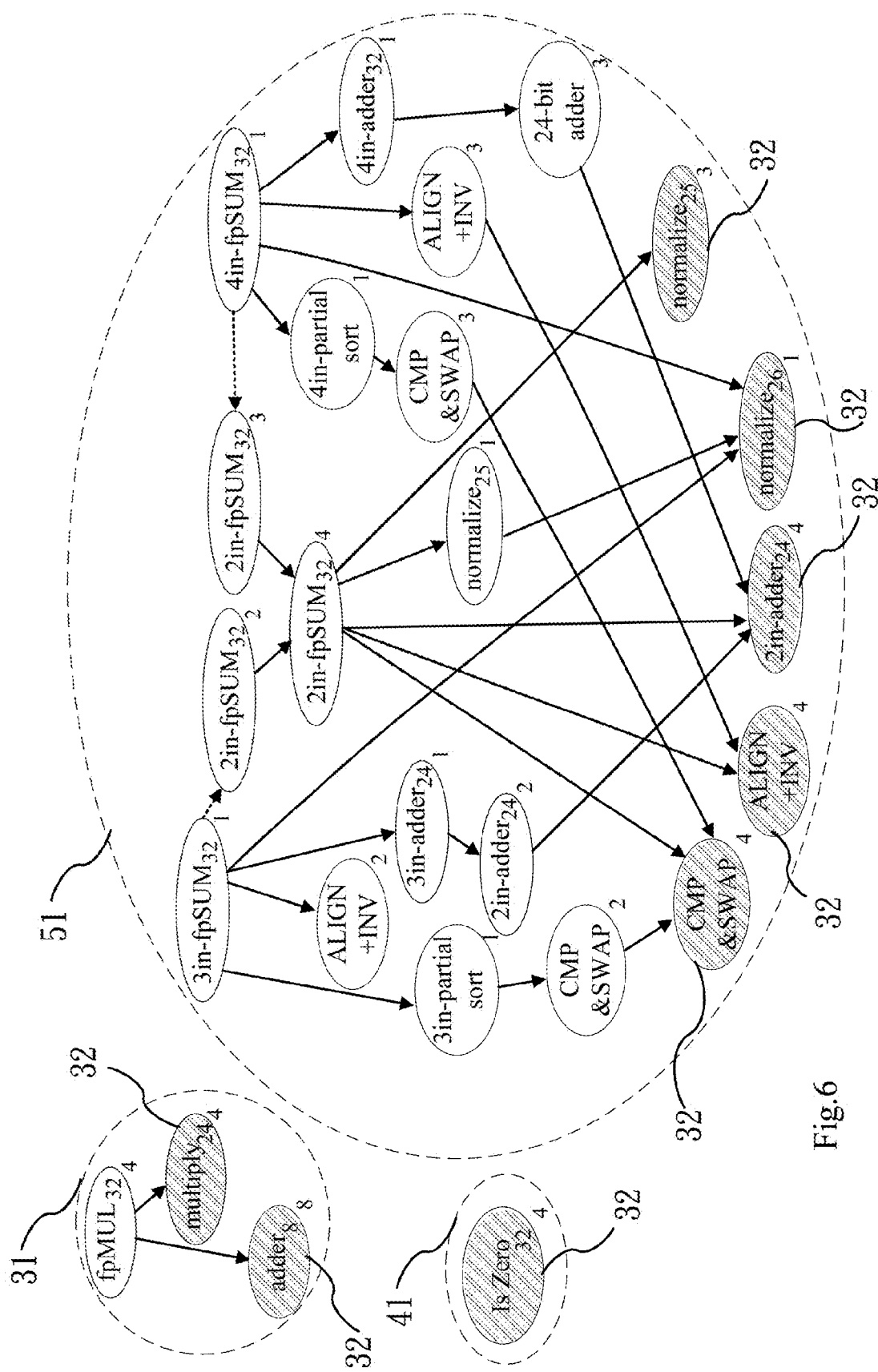
FIG. 6 is a schematic diagram showing the block-selection trees of the dynamic reconfigurable heterogeneous processor design choosing the sharable operation nodes according to an embodiment of the present invention.
Figure 7:
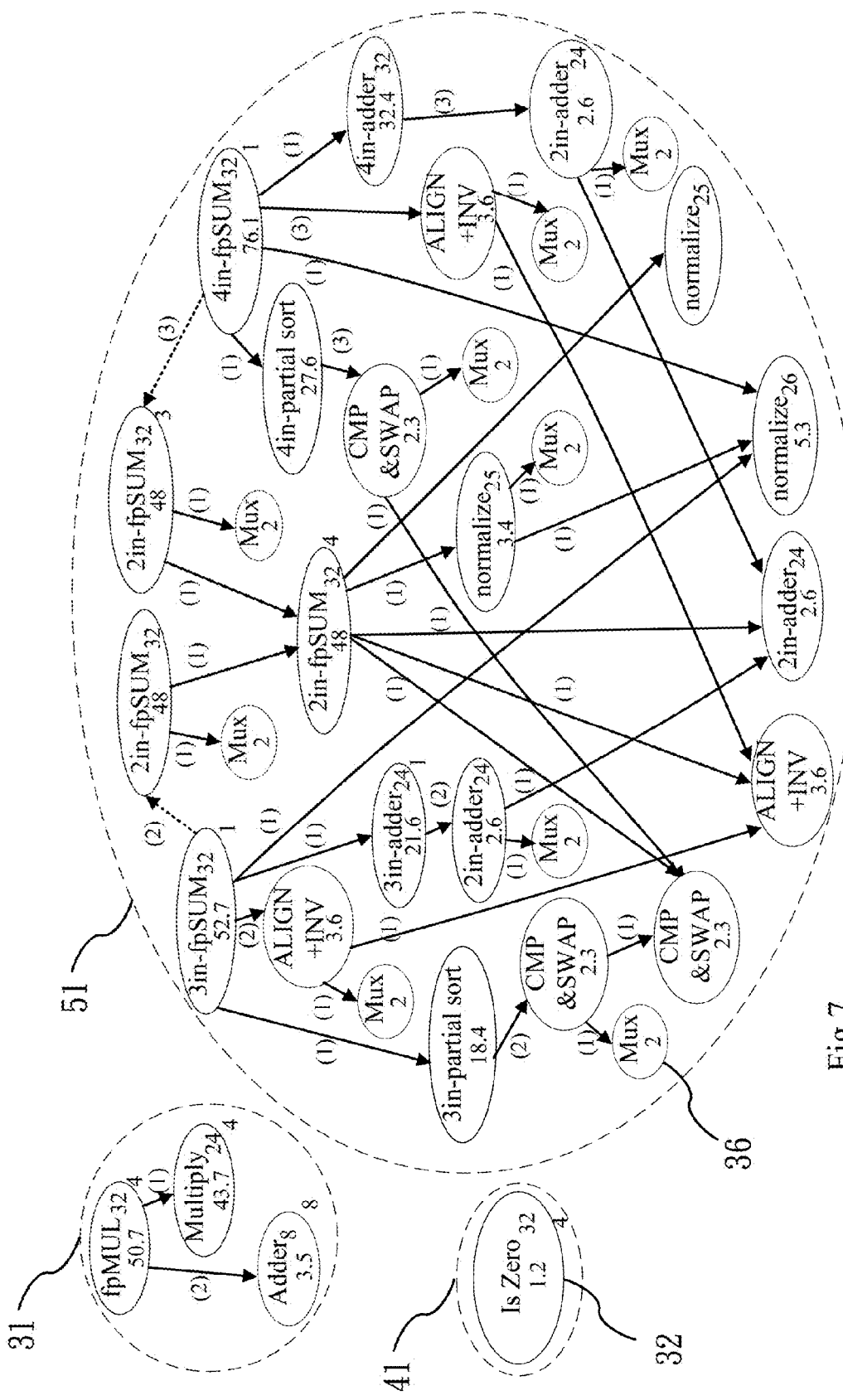
FIG. 7 is a schematic diagram showing the block-selection trees of the dynamic reconfigurable heterogeneous processor design with multiplexer nodes added according to an embodiment of the present invention.

Next the block selection is explained. The purpose of block selection is to define the basic function blocks to be used in the dynamic reconfigurable heterogeneous processors 10. A good selection of the set of blocks both saves hardware cost and simplifies the reconfiguration and rerouting needed. As shown in FIG. 5, the schematic diagram showing block-selection trees of the dynamic reconfigurable heterogeneous processor 10 design, some common operation nodes 32 in FIGS. 4(a) to 4(d) are identified from the operation requirement trees 30, 40, 50 and 60, and their block selection trees 31, 41 and 51 are formed. These block selection trees 31, 41 and 51 are independent sets of each other. Then, in FIG. 6, the schematic diagram showing the block-selection trees of the dynamic reconfigurable heterogeneous processor design choosing the sharable operation nodes, required and sharable common hardware circuits—shown as the leaf nodes 32 in FIG. 6—are identified. FIG. 7, the schematic diagram showing the block-selection trees of the dynamic reconfigurable heterogeneous processor design with multiplexer nodes added, shows that necessary multiplexers operation nodes 36 are added at a level higher than those sharable operation nodes 32 marked in FIG. 6. In addition, FIG. 7 relabels the block selection trees 31, 41 and 51 with the following: every operation node 32 is marked with its hardware cost (absolute or normalized to a reference design) in the lower portion inside the node; and every edge is marked with the number of lower-level operation nodes 32 needed to construct the upper-level operation node 32 by the edge in a pair of parentheses. As an example, in FIG. 7, the 32-bit floating-point multiplier (fpMUL$_{32}$) in block selection tree 31 has a hardware cost of 50.7 units, and it can be replaced or constructed using its descendents in the block selection tree 31: two Adds$_8$ and one Multiplier$_{24}$.

Figure 8:
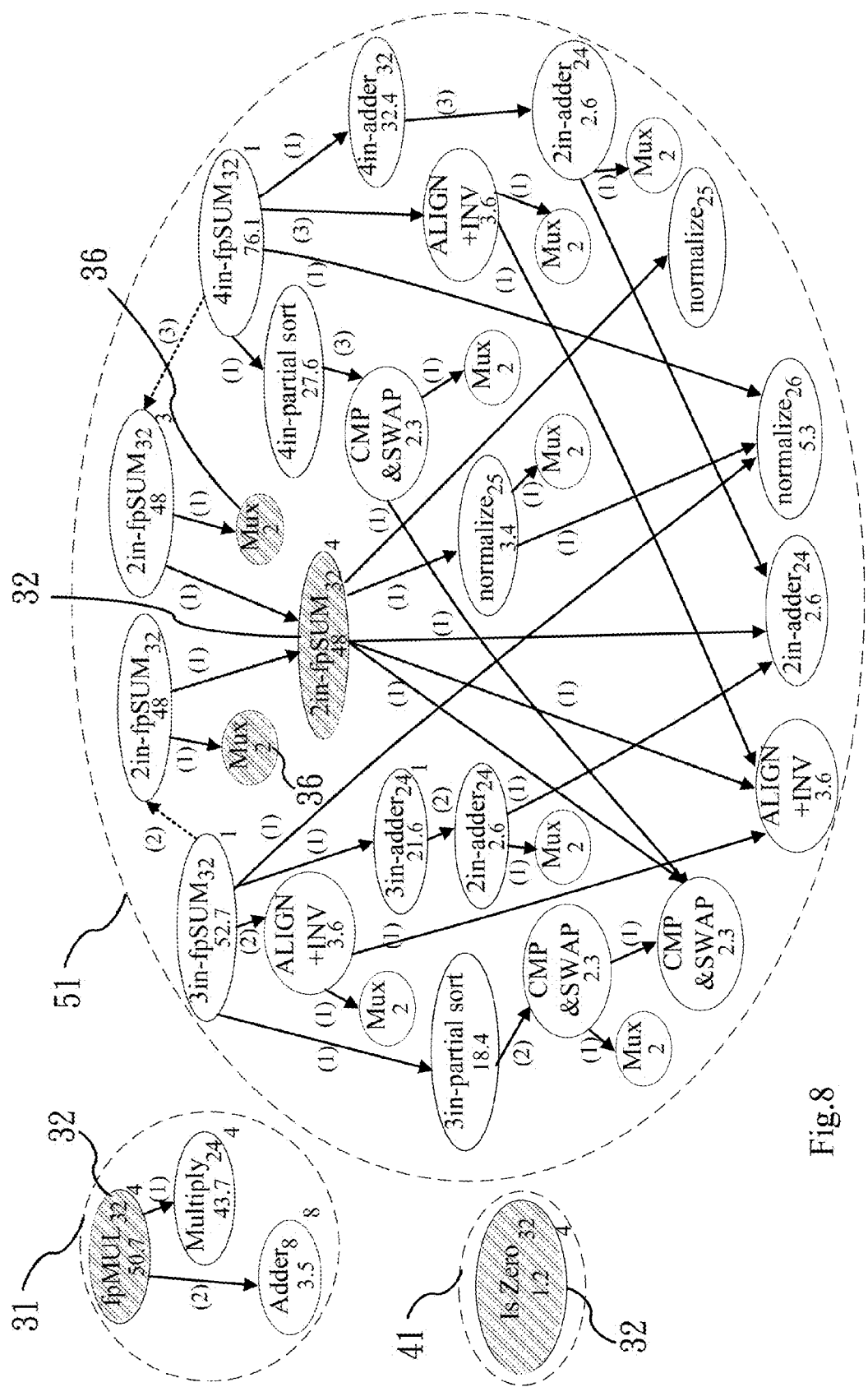
FIG. 8 is a schematic diagram showing the block-selection trees of the dynamic reconfigurable heterogeneous processor design choosing upward composable operation nodes and multiplexer nodes according to an embodiment of the present invention.

Finally, as shown in FIG. 8, the block selection trees 31, 41 and 51 will be searched for those composable operation nodes 32 and associated multiplexer (Mux) operation nodes 36, through means of linear programming or similar. The selected operation nodes should fulfill all necessary reconfiguration requirements of the dynamic reconfigurable heterogeneous processors 10, and the amounts of the selected operation nodes 32 and multiplexer (Mux) operation nodes 36, if not constrained, should fulfill the computation needs of the target dynamic reconfigurable heterogeneous processor system with load balancing and dynamic allocation as FIG. 1 shows. The goal is that the selected and equipped operation nodes and multiplexers can maximize the benefit of hardware sharing at a minimal cost. Hence the dynamic reconfigurable heterogeneous processor(s) 10 constructed in this way will have the best performance at their least cost.

According to the previous disclosure, the present invention uses a work control logic unit 16 to dynamically allocate the dynamic reconfigurable heterogeneous processor(s) 10 to balance the workloads of different processor types. The present invention provides a complete design picture, and it is highly compatible with most contemporary processor system designs. As long as the application requires noticeable amounts of varying types of operations, use of this invention in the system result in very good return on the investment.

The embodiments described above are only to exemplify the present invention but not to limit the scope of the present invention. Therefore, any equivalent modification or variation according to the shape, structures, characteristics and spirit disclosed in the present invention is to be also included within the scope of the present invention.

What is claimed is:

1. A dynamic reconfigurable heterogeneous processor architecture with load balancing, comprising:
   a plurality of microprocessors;
   at least one dynamic reconfigurable heterogeneous processor coupled to said plurality of microprocessors and assisting said plurality of microprocessors in executing operations; and
   a work control logic unit coupled to said plurality of microprocessors and said at least one dynamic reconfigurable heterogeneous processor, analyzing work proportion of each of said plurality of microprocessors, dynamically allocating said at least one dynamic reconfigurable heterogeneous processor to support said plurality of microprocessors to execute said operations, and balancing workload of each of said plurality of microprocessors;
   wherein a method of designing a circuit of said at least one dynamic reconfigurable heterogeneous processor comprising steps of:
      performing a plurality of hardware requirement analyses using operation requirement trees for basic operations of said plurality of microprocessors, wherein each of said operation requirement trees comprises a plurality of operation nodes showing an operation required;
      choosing common said plurality of operation nodes of said operation requirement trees to establish a plurality of block-selection trees;
      choosing sharable said plurality of operation nodes of said plurality of block-selection trees and adding a multiplexer operation node at each sharable said plurality of operation nodes, respectively; and
      searching all said plurality of block-selection trees and choosing said plurality of operation nodes and associated said multiplexer operation node of said plurality of block-selection trees that fulfill all necessary reconfiguration requirements of said at least one dynamic reconfigurable heterogeneous processor.

2. The dynamic reconfigurable heterogeneous processor architecture with load balancing according to claim 1, wherein said work control logic unit detects a noticeable imbalance of data or job buffers of said plurality of microprocessors under detection, which is used as a basis to analyze said work proportion of each of said plurality of microprocessors.

3. The dynamic reconfigurable heterogeneous processor architecture with load balancing according to claim 1, wherein said work control logic unit changes routing paths connecting said at least one dynamic reconfigurable heterogeneous processor and said plurality of microprocessors, whereby said at least one dynamic reconfigurable heterogeneous processor is dynamically allocated to assist said plurality of microprocessors.

4. The dynamic reconfigurable heterogeneous processor architecture with load balancing according to claim 1, wherein said at least one dynamic reconfigurable heterogeneous processor assists at least two of said plurality of microprocessors.

5. The dynamic reconfigurable heterogeneous processor architecture with load balancing according to claim 1, wherein said plurality of microprocessors are graphic processors, embedded processors, digital signal processors, multimedia processors, or a combination of such.

6. The dynamic reconfigurable heterogeneous processor architecture with load balancing according to claim 1, wherein said at least one dynamic reconfigurable heterogeneous processor is a multi-functional processor.

7. The dynamic reconfigurable heterogeneous processor architecture with load balancing according to claim 1, wherein in said step of searching all said plurality of block-selection trees, searching all said plurality of block-selection trees is based on linear programming.

8. The dynamic reconfigurable heterogeneous processor architecture with load balancing according to claim 1, wherein said plurality of operation nodes and said multiplexer operation node of said plurality of block-selection trees maximize a benefit of hardware sharing at a minimal cost.

9. The dynamic reconfigurable heterogeneous processor architecture with load balancing according to claim 1, wherein an amounts of said plurality of operation nodes and said multiplexer operation node of said plurality of block-selection trees meet hardware requirement to implement said basic operations of said plurality of microprocessors.

10. A dynamic allocation method with load balancing, comprising steps of:
   detecting instruction execution loads of a plurality of microprocessors in past predefined time interval by a work control logic unit;
   said work control logic unit calculating an actual amount of dynamically reconfigurable heterogeneous processors to be assigned to each processor type, and subtracts an amount of already-assigned said dynamically reconfigurable heterogeneous processors from a total amount of said dynamically reconfigurable heterogeneous processors to obtain a further amount of said dynamically reconfigurable heterogeneous processors to be reconfigured and assigned to that processor type, and said total amount of said dynamically reconfigurable heterogeneous processors includes an amount of said dynamically reconfigurable heterogeneous processors at present and said dynamically reconfigurable heterogeneous processors calculated by said work control logic unit and required at next stage;
   setting reconfiguration control signals which transform said dynamic reconfigurable heterogeneous processors into a desired processor type;
   gathering an amount of said dynamically reconfigurable heterogeneous processors to be reconfigured and assigned from a free dynamically reconfigurable heterogeneous processor pool and/or excessive dynamically reconfigurable heterogeneous processors from a lightly loaded type side after they finish their current computation, and generating a ready signal after available said dynamically reconfigurable heterogeneous processors of such amount are ready for their new assignment; and
   enabling said reconfiguration control signal using said ready signal such that said available said dynamic reconfigurable heterogeneous processors are properly reconfigured, and rerouting data links in interconnection and routing path according to a updated dynamic reconfigurable heterogeneous processor assignment; wherein a method of designing a circuit of said dynamic reconfigurable heterogeneous processors further comprising steps of:
      performing a plurality of hardware requirement analyses using operation requirement trees for basic operations of said plurality of microprocessors, wherein each said operation requirement tree comprises a plurality of operation nodes showing an operation required;
      choosing common said plurality of operation nodes of said operation requirement trees to establish a plurality of block-selection trees;
      choosing sharable said plurality of operation nodes of said plurality of block-selection trees and adding a multiplexer operation node at each sharable said plurality of operation nodes, respectively; and searching all said plurality of block-selection trees and choosing said plurality of operation nodes and associated said multiplexer operation node of said plurality of block-selection trees that fulfill all necessary reconfiguration requirements of said dynamic reconfigurable heterogeneous processors.

11. The dynamic allocation method with load balancing according to claim 10, wherein in a step of said work control logic unit detecting said instruction execution loads of said plurality of microprocessors in past predefined time interval, said work control logic unit detects a noticeable imbalance of data/job buffers of said plurality of microprocessors under detection.

12. The dynamic allocation method with load balancing according to claim 10, wherein said further amount of dynamically reconfigurable heterogeneous processors to be reconfigured and assigned to heavier loaded processor type is calculated.

13. The dynamic allocation method with load balancing according to claim 10, wherein in step of allocating said dynamic reconfigurable heterogeneous processors to said plurality of microprocessors that requires assistance, said work control logic unit changes said routing paths connected with said dynamic reconfigurable heterogeneous processors and said plurality of microprocessors whereby said dynamic reconfigurable heterogeneous processors is dynamically allocated to assist said plurality of microprocessors that require assistance.

14. The dynamic allocation method with load balancing according to claim 10, wherein said ready signal and said reconfiguration control signals are used together to reconfigure said dynamic reconfigurable heterogeneous processors.

* * * * *